US009071626B2

(12) United States Patent
Morris et al.

(10) Patent No.: US 9,071,626 B2
(45) Date of Patent: Jun. 30, 2015

(54) METHOD AND APPARATUS FOR SURVEILLANCE SYSTEM PEERING

(71) Applicants: Stephen Jeffrey Morris, Harvard, MA (US); Steven Arnold Bolton, Harvard, MA (US); Donald Campbell, Washington, DC (US)

(72) Inventors: Stephen Jeffrey Morris, Harvard, MA (US); Steven Arnold Bolton, Harvard, MA (US); Donald Campbell, Washington, DC (US)

(73) Assignee: VIDSYS, INC., Vienna, VA (US)

( * ) Notice: Subject to any disclaimer, the term of this patent is extended or adjusted under 35 U.S.C. 154(b) by 54 days.

(21) Appl. No.: 13/652,712

(22) Filed: Oct. 16, 2012

(65) Prior Publication Data

US 2013/0057384 A1 Mar. 7, 2013

Related U.S. Application Data

(63) Continuation-in-part of application No. 12/571,953, filed on Oct. 1, 2009, now Pat. No. 8,305,211.

(60) Provisional application No. 61/102,552, filed on Oct. 3, 2008.

(51) Int. Cl.
*G05B 19/00* (2006.01)
*H04L 29/08* (2006.01)
*H04L 29/06* (2006.01)
*G08B 13/196* (2006.01)
*G08B 25/00* (2006.01)
*G08B 25/08* (2006.01)

(52) U.S. Cl.
CPC ...... *H04L 67/1095* (2013.01); *G08B 13/19656* (2013.01); *G08B 25/006* (2013.01); *G08B 25/085* (2013.01); *H04L 63/104* (2013.01)

(58) Field of Classification Search
USPC ......... 340/5.74, 5.8, 5.81–5.86, 825.36, 7.46, 340/7.52, 10.32, 10.42, 7.61
See application file for complete search history.

(56) References Cited

U.S. PATENT DOCUMENTS

| 4,992,866 | A | | 2/1991 | Morgan |
| 5,258,837 | A | * | 11/1993 | Gormley ...................... 348/441 |
| 5,708,780 | A | | 1/1998 | Levergood et al. |
| 5,729,471 | A | | 3/1998 | Jain et al. |

(Continued)

OTHER PUBLICATIONS

Arman et al., Content-based Browsing of Video Sequences, Siemens Corporate Research, Inc., Princeton, NJ, pp. 97-103, Multimedia, San Francisco, ACM 0-89791-686-7/94/0010, 1994.

(Continued)

*Primary Examiner* — Daniel Previl
(74) *Attorney, Agent, or Firm* — Chapin IP Law, LLC

(57) ABSTRACT

A security installation positions a peering ability with a peer installation by establishing a peering agreement to define the conditions constituting a situation for which peering applies, and identifies the resources and assets which will be shared, as well as the duration of the peering, typically until the resolution of the exigent situation or circumstances that prompted the peering. Peering selectively couples security installations for monitoring a particular upon determining that a situation responsive to mediation has occurred within an area monitored by the security installation for monitoring an area. The security installation initiates a peering invitation to a peer installation, in which the peer installation is configured to share resources with the security installation for mitigating the cause of the situation. The resulting peered access provides communication between the peer installation and the security installation, the access being temporary and conditional on the exigency of the determined situation.

18 Claims, 10 Drawing Sheets

(56) References Cited

U.S. PATENT DOCUMENTS

| | | | |
|---|---|---|---|
| 6,437,819 B1 | 8/2002 | Loveland | |
| 6,476,858 B1* | 11/2002 | Ramirez Diaz et al. | 348/159 |
| 6,484,545 B1* | 11/2002 | Peter et al. | 70/288 |
| 6,807,361 B1 | 10/2004 | Girgensohn et al. | |
| 7,058,204 B2 | 6/2006 | Hildreth et al. | |
| 7,106,361 B2 | 9/2006 | Kanade et al. | |
| 7,149,974 B2 | 12/2006 | Girgensohn et al. | |
| 7,187,783 B2 | 3/2007 | Moon et al. | |
| 7,196,722 B2 | 3/2007 | White et al. | |
| 7,222,300 B2 | 5/2007 | Toyama et al. | |
| 7,236,176 B2 | 6/2007 | Milinusic | |
| 7,242,295 B1 | 7/2007 | Milinusic et al. | |
| 7,242,423 B2 | 7/2007 | Lin | |
| 7,272,639 B1 | 9/2007 | Levergood et al. | |
| 7,275,210 B2 | 9/2007 | Girgensohn | |
| 7,295,228 B2 | 11/2007 | Roberts et al. | |
| 7,310,111 B2 | 12/2007 | Ramirez-Diaz et al. | |
| 7,342,489 B1 | 3/2008 | Milinusic et al. | |
| 7,457,283 B2 | 11/2008 | Dalton et al. | |
| 7,457,288 B2 | 11/2008 | Park et al. | |
| 7,583,414 B2 | 9/2009 | Kawai | |
| 7,595,815 B2 | 9/2009 | Donovan et al. | |
| 7,720,257 B2 | 5/2010 | Morellas | |
| 7,746,380 B2 | 6/2010 | Maruya et al. | |
| 7,752,548 B2 | 7/2010 | Mercer | |
| 7,777,783 B1* | 8/2010 | Chin et al. | 348/211.99 |
| 7,797,640 B2 | 9/2010 | Baumann | |
| 7,817,716 B2 | 10/2010 | Wells | |
| 7,823,056 B1 | 10/2010 | Davey et al. | |
| 7,843,491 B2 | 11/2010 | Vallone et al. | |
| 8,305,211 B1 | 11/2012 | Morris et al. | |
| 8,345,963 B2 | 1/2013 | Tedesco et al. | |
| 2002/0097322 A1 | 7/2002 | Monroe et al. | |
| 2003/0062997 A1* | 4/2003 | Naidoo et al. | 340/531 |
| 2004/0239763 A1 | 12/2004 | Notea et al. | |
| 2004/0257444 A1 | 12/2004 | Maruya et al. | |
| 2005/0200717 A1* | 9/2005 | Endo et al. | 348/211.99 |
| 2006/0221184 A1 | 10/2006 | Vallone et al. | |
| 2006/0284978 A1 | 12/2006 | Girgensohn et al. | |
| 2007/0039030 A1 | 2/2007 | Romanowich et al. | |
| 2007/0279494 A1 | 12/2007 | Aman et al. | |
| 2008/0088706 A1 | 4/2008 | Girgensohn et al. | |
| 2008/0117286 A1 | 5/2008 | Cernasov | |
| 2008/0198231 A1 | 8/2008 | Ozdemir et al. | |
| 2008/0211915 A1 | 9/2008 | McCubbrey | |
| 2009/0237508 A1 | 9/2009 | Arpa et al. | |
| 2009/0262984 A1 | 10/2009 | Hildreth et al. | |
| 2010/0002082 A1 | 1/2010 | Buehler et al. | |
| 2010/0070097 A1 | 3/2010 | Morgenstern et al. | |
| 2010/0176916 A1* | 7/2010 | Baucom | 340/5.5 |
| 2010/0281171 A1 | 11/2010 | Khasnabish | |

OTHER PUBLICATIONS

Ardizzone et al., An Integrated Architecture for Surveillance and Monitoring in an Archaeological Site, DINFO—University of Palermo, Viale delle Scienze, ed. 6, Palermo, Italy, pp. 79-85, ACM 1-59593-242-9/05/0011, 2005.

Atrey et al., Timeline-based Information Assimilation in Multimedia Surveillance and Monitoring Systems, School of Computing, National University of Singapore, Republic of Singapore, pp. 103-112, ACM 1-59593-242-9/05/011, 2005.

Cheung, Sen-Ching S. and Kamath, Chandrika, Robust Technique for Background Subtraction in Urban Traffic Video, Center for Applied Scientific Computing, Lawrence Livermore National Laboratory, LIvermore, CA.

Cucciara, Rita, Multimedia Surveillance Systems, Dipartimento di Ingegneria dell Informazione, University of Modena and Reggio Emilia, Italy, ACM 1-59593-242-9/05/0011, 2005.

Daniel, Gareth and Chen, Min, Video Visualization, IEEI Visualization 2003, Oct. 19-24, 2003, Seattle, WA, pp. 409-416, ISBN 0/7803-8120-3.

Huston et al., Forensic Video Reconstruction, Proceedings of ACM International Workshop on Video Surveillance and Sensor Networks (VSSN), IRP-TR-04-10, Aug. 2004, Intel Coproration.

Iannizzotto et al., A Multimodal Perceptual User Interface for Video-surveillance Environments, Visilab Faculty of Engineering, University of Messina, Italy, ICMI'05, Oct. 4-6,2005, Trento, Italy, pp. 45-52, ACM 1-59593-028-0/05/0010.

Korshunov, Pavel and OOI, Wei Tsang, Critical Video Quality for Distributed Automated Video Surveillance, School of Computing, University of Singapore, MM'05, Nov. 6-11, 2005, Singapore, pp. 151-160, ACM 1-59593-044-02/05/0011.

Lipton et al., Critical Asset Protection, Perimeter Monitoring, and Threat Detection Using Automated Video Surveillance, ObjectVideo, Reston, VA.

Lipton, Alan J., Intelligent Video Surveillance in Crowds, ObjectVideo, Reston, VA.

Lipton, Dr. Alan J., Object Video Forensics: Activity-Based Video Indexing and Retrieval for Physical Security Applications, ObjectVideo, Reston, VA.

Pillai et al., Multi-Fidelity Storage, VSSN'04, Oct. 14, 2004, New York, NY, pp. 72-79, ACM 1-58113-934-9/04/0010.

ObjectVideo Vew, You Set the Rules. Before They Cross the Line., www.objectvideo.com, Reston, VA.

ObjectVideo Vew, You Set the Rules. Before They Cross the Line., www.objectvideo.com/products/vew/capabilities, Reston, VA.

Sebe et al., 3D Video Surveillance with Augmented Virtual Environments, Integrated Media Systems Center, University of Southern California, Los Angeles, CA, IWVS'03, Nov. 7, 2003, Berkeley, CA, pp. 107-112, ACM 1-58113-780-X/03/00011.

Wang et al., Real-Time Surveillance Video Display with Salience, Dept. of Computer Science and Engineering, The Chinese University of Hong Kong, VSSN'-5, Nov. 11, 2005, Singapore, pp. 37-43, ACM 1-59593-242-9/05/0011.

Wang et al., Experiential Sampling for Video Surveillance, IWVS'03, Nov. 7, 2003, Berkeley, CA, ACM 1-58113-780-X/00011.

Wu et al., Multi-camera Spatio-temporal Fusion and Biased Sequence-data Learning for Security Surveillance, Electrical & Computer Engineering and Computer Science, University of California, Santa Barbara, CA, MM'03, Nov. 2-8, 2003, Berkeley, CA, ACM 1-58113-722-2/03/0011.

International Search Report mailed Nov. 21, 2008 in counterpart International Application Serial No. PCT/US2008/064578.

* cited by examiner

METHOD AND APPARATUS FOR SURVEILLANCE SYSTEM PEERING

RELATED APPLICATIONS

This Patent Application is a continuation in part under 35 U.S.C. §120, of U.S. patent application Ser. No. 12/571,953, filed Oct. 1, 2009, entitled "METHOD AND APPARATUS FOR SURVEILLANCE SYSTEM PEERING" which claims the benefit under 35 U.S.C. §119(e) of the disclosure of U.S. Provisional Patent Application No. 61/102,552, filed Oct. 3, 2008, entitled "METHOD AND APPARATUS FOR VIDEO SYSTEM PEERING," incorporated herein by reference in entirety.

BACKGROUND

Advancement of modern security techniques have benefited greatly from electronic advances in multimedia sensing and transmission, such as smaller and less expensive video cameras and monitoring devices. Security equipment and a corresponding staff and/or monitoring location may generally be found in any semi-public or common use environment. A particular area such as a school campus, institution, building, or collection thereof, may be therefore be protected by a security installation—an arrangement of surveillance and restriction devices electronically connected and may be operated by dedicated security personnel. Such a security installation, including features such as video monitors, remote door locks, mechanical gates, motion and other sensors and RFID tags for identifying and tracking people and objects, may be selected for a particular area, facility, building or campus for providing security and intrusion detection for those within.

SUMMARY

Recent decades have been marked by increasing availability of electronic security and surveillance equipment, particularly for audio and video recording and transmission capability. Advances in video technology, remote sensors and microprocessor based controls have increased availability of video monitoring systems, home perimeter protection, and object identification and tracking mechanisms such as RFID (Radio Frequency Identification) and bar code symbols. Video recording systems, once reserved for "high risk" installations such as banks, are now commonplace in retail, public transportation, and commercial locations.

Accordingly, it is commonplace for a security installation to provide surveillance and security over an area or facility. Security installations for covering large facilities or areas such as warehouses, educational institutions, corporate building clusters, public schools, and others with large "campus like" areas present many options and possible approaches for an appropriate arrangement of security resources and assets. Equipment representing such security resources and assets is often controlled through a system or server configured to provide Physical Security Information Management (PSIM) capability, such as through PSIM products offered by VidSys Inc., of Vienna, Va., assignee of the present application.

It would be beneficial to provide an aggregation of security installations such that large scale video and other devices of arbitrary manufacture can be made available to be used by operators or persons remote or near to the devices. Authorized users can search/locate devices of interest and subject to appropriate access control can operate those devices or use their resources. Adjacent or related security installations cooperatively form a so-called "peering" relationship. The "peered" servers publish information about resources into a data/metadata store, such as a cloud based directory, the metadata including information on each of the devices, such as name, type, location (both textual and GIS coordinates, possibly altitude as well). Data, in the case of sensors, may include the current and/or historical values. Servers publish access control information that details requirements that much be met in order to have access to its published data/metadata.

A centralized PSIM server (server) integrates the various resources and assets in the security installation, including selective coupling with a remote command and control system for remote and/or supplemental sharing of control and data via the peering relationships. Configurations herein are based, in part, on the observation that a dynamic ability to link the technological security resources (i.e. video, communications, control) of multiple organizations, such as between an affected entity or institution and a first responder or adjacent security installation may facilitate a timely response or enhance safety. Such peering relationships provides invocation of another security installation or system, thus allowing sharing of control and information for managing a security response scenario. A peering arrangement and interface as disclosed herein substantially overcomes the above described shortcomings by allowing the peered system, such as operated by a police, fire, or other first responder, to access resources and control assets of the security installation experiencing the breach, situation, or anomaly for which a response has been requested. A security installation predisposes a peering ability with a peer installation by establishing a peering agreement to define the conditions constituting a situation for which peering applies, and identifies the resources and assets which will be shared, as well as the duration of the peering, typically until the resolution of the exigent situation or circumstances that prompted the peering.

Peering as defined herein is the ability for two or more 'systems' to share resources, such as video cameras, maps, diagrams, documents, other video and non-video resources, and to allow access and control of these resources to be available to the peer on either a full-time or as needed/allowed basis.

Security installation peering, therefore, provides a mechanism for the locally defined resources to be known and accessed by the peer, i.e. it contains a directory service of resources and access to the resources. Additionally, it may provide metadata about the resources that allows the peers to organize the resource directories for logical display on a remote system, i.e. the directory service may provide metadata that describes what the resources are, where they are, what they are capable of, etc. This would allow a remote peer to place the resources on a 'map;' it may also allow the remote system to retrieve a floor plan of a peer to place those resources on for display; in the case of physical devices, it may tell what type of device a particular resource is, and what services that resource provides. In the case of a 'camera' it may tell what make/model camera it is, if the camera supports PTZ (Pan Tilt Zoom), what format of video it is capable of sending, where it's physically located via GIS coordinates, and logically 'where' it is located, i.e. what part of a building it's located in such as "Second Floor," or "Library."

The peered systems may be owned and operated by the same organization, in any suitable topology, for example, hub and spoke, hierarchal, mesh, ad-hoc, or hybrid snow flake, i.e., hierarchal organization of different hub and spokes. They may also be owned and/or operated by different organizations or the same organization but operated locally separate, maintaining independence of topology. Peering between different organizations is typically thought of as autonomous peering, i.e., each system is usually operated and managed independently, and devices are not defined in both systems. The peer institution typically only knows of the others resources via the peering relationship, and not because some operator has preconfigured the peer's resources into both systems.

In another particular configuration, rather than defining individual peering relationships between individual locations or facilities, the peering system involves cooperative usage of a central repository or "clearinghouse" for aggregating pools of contributed resources and security assets for common access by a plurality of subscribers. A contributor, or owner of a resource/asset, permits access by a subscriber. The conditions for access may be defined by rules, and may not necessarily require an exigent situation. Each subscriber and contributor may be a particular facility, organization or security installation. In this arrangement, multiple security installations permit peering by other security installations by contributing resources, or indicating shareability of some or all of the resources available. Typically, a "security installation" is defined by a set of one or more collocated buildings having a centralized security and monitoring system, usually characterized by a security office or control point for all of the resources invokable for monitoring and managing the installation. Larger entities, such as major corporations, may have many sites at various location, in which each site has a campus setting or collection of buildings served by a single monitoring location (e.g. security office) where all the resources and assets (cameras, gates, door locks, etc.) are monitored and controlled.

The clearinghouse is a set of remote servers having a common or distributed arrangement of information relating to contributed, i.e. shareable, resources and the conditions under which the resources may be shared. Alternatively, any suitable arrangement of distributed or centralized servers may suffice. An agent is charged with the responsibility of designating access to the contributed, shareable resources. The resources, such as cameras, are responsive to tokens granted by the agent of the contributing entity, and may be managed by an agent station representing a distributed node of the distributed clearinghouse, which stores tokens for which the agent is empowered to distribute. Depending on the entity (corporation) behind the security installation, distribution of the tokens may be granularized according to desired corporate guidelines. A larger corporation may wish to distribute the agent ability among several personnel, as a kind of checks and balances approach. A converse approach may be to maintain one focal point for all token distribution, thus delegating to a single agent for all sites. One feature of the system therefore identifies types of information sharing that exists between the peering entities, such as agents, contributors and subscribers, and specifying trust relationships at a system level. Each entity contributing resources or security assets delegates, via the agents, an ability to grant access to the contributed resources. The contributed resources may be all or a subset of the resources of the entity. For example, security installations around a common public area such as a park or garage may agree to contribute cameras adjacent to the common area.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
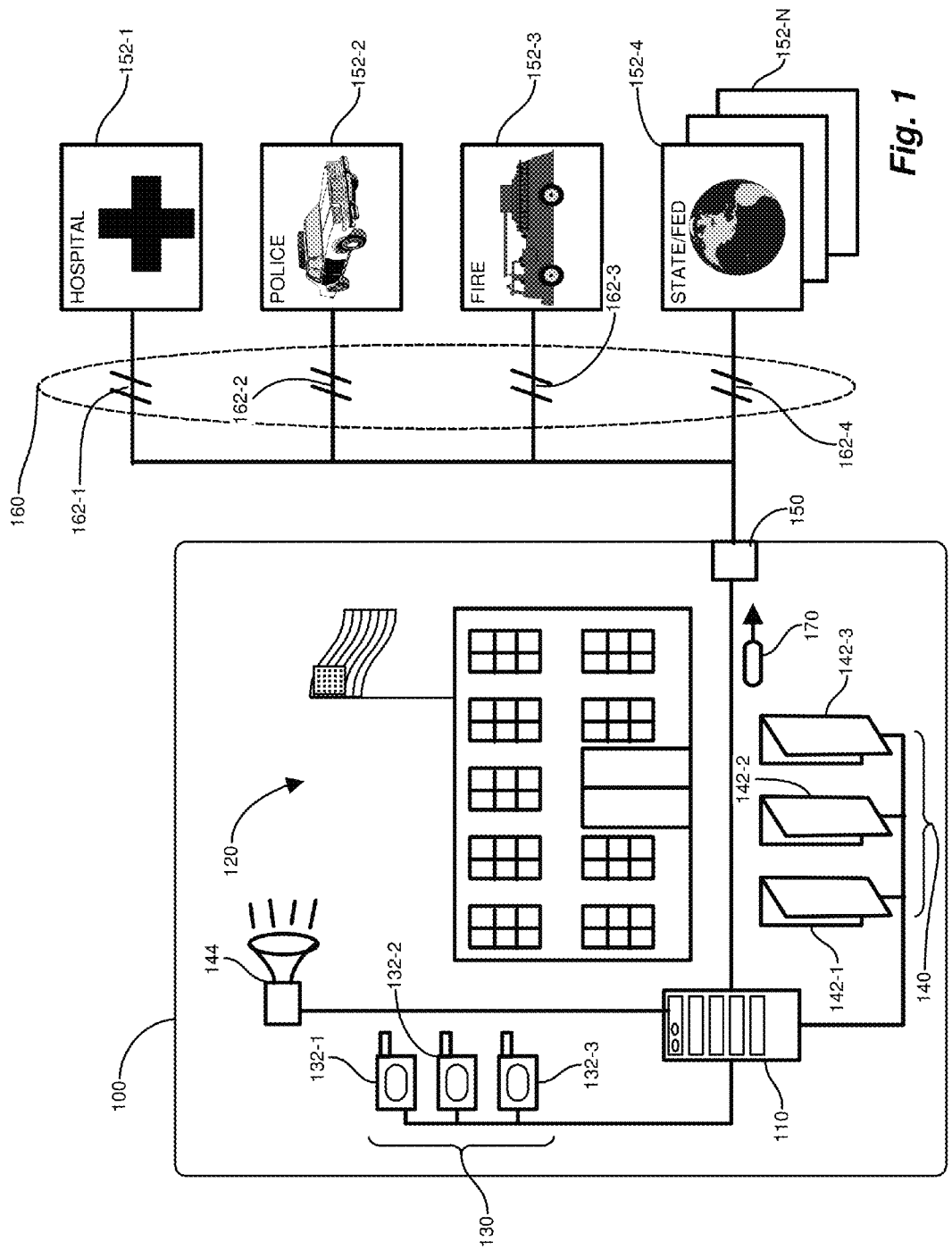
FIG. 1 is a context diagram of a monitored environment suitable for use with the present configuration.

Disclosed below is a description and several scenarios depicting peering of a security installation (security system) covering a particular area with a peer installation to which the peering request is directed. In the case of a bi-directional peering, the sharing of resources is mutual and the distinction of a security installation and peering installation servers to merely distinguish the separate installations. In the case of a unidirectional system, the peer installation is the one sought for peering and is the installation extended the access into the security installation, although the reverse does not necessarily apply. Particular features discussed further below include the immediacy of the peering that is enabled by a preexisting peering agreement and identified peering interface, the conditions under which peering is initiated, particularly exigent circumstances, and the extend and duration of access—how much access and for how long. Peering differs from a continuous or intermittent connection because the peering is enabled in response to an exigent situation, and is therefore designed to be quickly enabled, and only for the duration of the exigent situation that calls for peer access. In the hypothetical scenarios that follow, these parameters will be defined in terms of example usage; other uses and extent of parameters may be apparent.

As an example use case, consider school system in a large metropolitan area has concerns about its security, and has installed a video monitoring system with multiple cameras. The cameras are located in the hallways, by the doors, and in common rooms, such as the cafeteria, and library. They may or may not have cameras in every classroom, and they may or may not have recording devices for the video (typically Network Video Recorders In this use case, there is a potential problem detected, a possible gun shot is heard via a monitor (camera w/audio) at the school, and the local police have been contacted. The local police have a unidirectional peering relationship with the school. Police officers are dispatched to the school, at the same time, the police HQ is bringing up the floor plan of the school and starting to examine the cameras in the school via the peering relationship to determine the potential cause and current status. In the case of an escalated situation, the local police may elect to call in the state police, and since the local police and the state police also have a peering relationship (possibly two way), the local police could allow the state police to use their peering capability into the school as well.

A larger scale implementation comprises a system whereby video and other devices of arbitrary manufacture, can be made available to be used by operators or persons remote or near to the devices on a larger, centralized scale. Users of the system can search/locate devices of interest and subject to appropriate access control can operate those devices or use their resources. Such an approach encompasses multiple servers, that own nearby resources, with a goal that the distance and networks that data needs to flow when not needed elsewhere is reasonably short, i.e. a server in a neighborhood municipal building (perhaps a police station, school, hospital, etc) recording the data for cameras throughout all or part of a neighborhood.

FIG. 1 is a context diagram of a monitored environment suitable for use with the present configuration. Referring to FIG. 1, a monitored environment 100 includes a security installation 110 securing an area 120 or facility. The secured area 120 may be an institutional building such as a school or hospital, business or educational complex, or industrial site such as a warehouse environment. The security installation 110 includes resources 130, such as video cameras 132-1 . . . 132-3 (132 generally), and assets 140, such as door locks 142-1 . . . 142-3 (142 generally). Generally, the security resources and assets include any physical or logical material such as a device or information relevant to controlling, monitoring and/or protecting the premises and curtilage of the security installation. Therefore, a resource is typically a device that registers itself with the system and makes data and metadata available to the system. The resource might also have more data that can be access by contacting the device directly. The security installation 110 has a peer interface 150 to potential peer installations 152-1 . . . 152-N (152 generally), coupled by a selective peer connection 160, including selectively activated peer links 162-1 . . . 162-4 (162 generally) to the individual peer installations 152. Depending on the nature and robustness of the peer installation 152, the peer links 162 may vary in robustness and capability. Upon determination of an exigent situation (situation), the peer connection 160 is invoked via the peer interface 150 to activate one or more of the peer links 162. The peer connection 160 allows the peer installation 152 to invoke resources such as the cameras 152, and operate assets such as doors 142 and voice communications 144, such as a public address (PA) system. Thus, the peering of the peer installation 152-3 of the fire department would allow fire personnel to observe video cameras 132 and make announcements for directing exiting crowds away from fire and smoke via voice communications 144 (e.g. PA).

Resources and security assets within the system may therefore encompass a variety of entities, including sensors, cameras, recording devices (typically Network Video Records), analytic devices, such as chemical/radiological sensors, and higher-order systems such as PSIM systems that are reporting on and providing control over situations within the area and are making their situation data available as data to be used statically or as pointers to the actual situation records. Data can be annotated to include historical or trend information, as well as normal range info. Data may be marked as exceptional, or carry an alarm state and a severity, it may contain not only a location (text and/or GIS), but may contain any number of techniques to declare the size/shape of the affected area. Resources may also include further metadata such as references to maps or floor plans of the nearby area. Maps, floor plans, map layers, documents, policy documents and other items may be registered as resources. Resources may include other metadata such as owner, Company, Agency, State.

Figure 2:
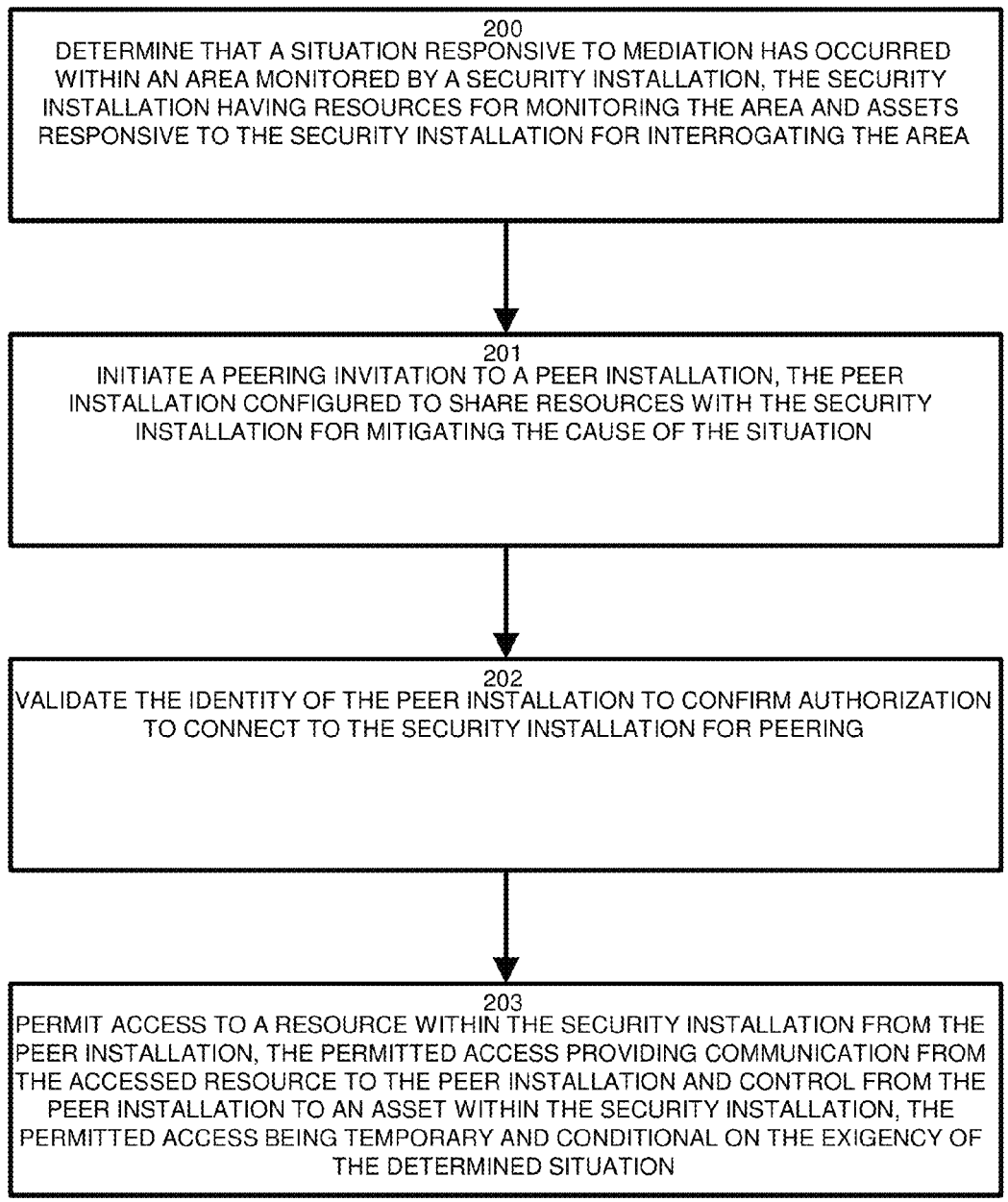
FIG. 2 is a flowchart of security system peering in the environment of FIG. 1.

FIG. 2 is a flowchart of security system peering in the environment of FIG. 1. Referring to FIGS. 1 and 2, the method of selectively coupling security installations for area monitoring as disclosed herein includes, at step 200, determining that a situation responsive to mediation has occurred within an area 100 monitored by a security installation 110 having resources 130 for monitoring the area, and assets 140 responsive to the security installation 110 for interrogating the area 100. The security installation 110 initiates a peering invitation 170 to a peer installation 152, in which the peer installation 152-N is configured to share resources 130 and assets 140 with the security installation 110 for mitigating the cause of the situation, as depicted at step 201. The peer installation 152 may, for example, be a security system of a local first responder such as police 152-2 or fire 152-3, or it may be of a less exigent nature, such as a security installation of a related company or corporate partner seeking peering for efficiency or logistic reasons rather than an emergency response. The security installation 110 validates the identity of the peer installation 152 to confirm authorization to connect to the security installation 110 for peering, as shown at step 202, to avoid unwarranted access and to identify any predetermined peering parameters such as access and duration, discussed further below. Following successful validation, or authentication, the security installation permits access to a resource 130 within the security installation 110 from the peer installation 152, such that the permitted access provides communication from the accessed resource 130 to the peer installation 152 and control from the peer installation 152 to an asset 140 within the security installation 110, as depicted at step 203. The permitted access is generally temporary and conditional on the exigency of the determined situation, however duration and/or extent of access may be varied to suit the situation at hand, also discussed further below.

Figure 3A:
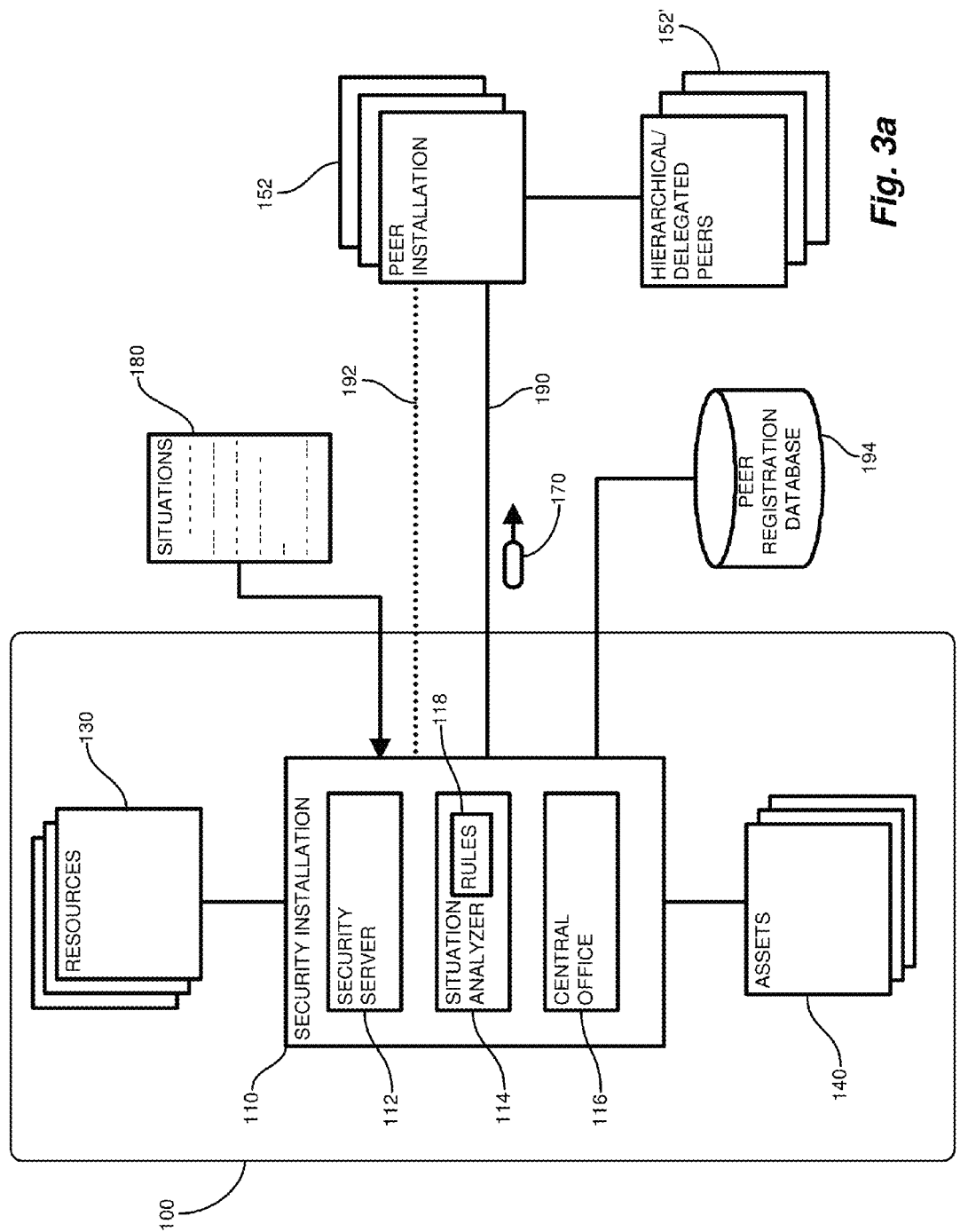
FIG. 3a is a block diagram of security monitoring system peering according to the flowchart of FIG. 2.

FIG. 3a is a block diagram of security monitoring system peering according to the flowchart of FIG. 2. Referring to FIGS. 1 and 3a, the security installation 110 performs security monitoring over an area 100, such as a building, campus, facility, etc. The security installation 110 includes an array of physical components distributed throughout the area 110 and having a central dispatch or focal point preferable configured for human operator feedback and direction. Such a dispatch may take the form of a security office or booth, and includes a security server 112 (server), a situation analyzer 114, a central office 116 for human interaction, and a peer interface 150 for establishing a peer connection 190 to peer installations 152. The server 112 includes processors and instructions for electronic communication and control of the resources and assets, such as the PSIM system previously described, and for computing and implementing appropriate responses thereto. In the example arrangement, the server 112 includes software products commercially marketed by VidSys, Inc., as disclosed above.

The situation analyzer 114 determines when a situation warranting peering occurs. The situation analyzer 114 performs a rule based analysis using input from the resources 130, and rules 118 derived from the peering agreement 180, and may include features such as those outlined in copending U.S. patent application Ser. No. 12/125,115, filed May 22, 2008, entitled "EVENT CAPTURE, CROSS DEVICE EVENT CORRELATION, AND RESPONSIVE ACTIONS," incorporated herein by reference. Based on the peering agreement, the rules 118 specify the types and number of events that trigger a situation, and the peer installation 152 that a peering invitation 170 would apply to. For example, a high temperature indication coupled with a smoke detection would trigger a rule that a peering invitation 170 is made to the peer installation 152-3 of the fire department. Similarly, a sharp sound such as a gunshot or glass breaking, coupled with an after hours motion sensor alarm would trigger a rule that the peer installation 152-2 of the police department be invoked. Rules may also require recurrence or frequency, such as a series of after hours movement (motion) in a dormant area, to accommodate the occasional rounds of a security guard or janitor, for example.

A set of resources 130, such as video cameras 132, fire sensors, motion detectors, door/window detectors and others provide input to the server 112, and a set of assets 140 receives direction for performing actions within the area 100, such as locking and unlocking doors, opening and closing gates, operating lights, and sending a peering invitation 170, discussed further below. The peering invitation may require proactive sanctioning or confirmation by a human operator, or may permit self authorization by a responding party, as in the case of a fire where it is unlikely or undesirable to expect and receive an affirmative confirmation.

The peering invitation 170 is received from the interface 150 by a peer installation 152, or implied 192 as in the case of automatic or self authorization. The interface 150 continues to support the connection 190 to the peer installation 152 for allowing access and control of resources 130 and assets 140. Further, peering rights may be delegated or hierarchically assigned to one or more delegated peers 152'. For example, a police or fire peer installation 152-2, 152-3 may delegate to the local hospital 152-1, or a particular situation may escalate according to a hierarchy of state and federal authorities, such as to state police and then to a federal entity such as the FBI or EPA, for example, depending on the nature of the situation.

In an alternate configuration, sharing of security assets and resources applies more generally to a group of resource owned by different entities desiring to cooperatively "pool" their resources. Such cooperation may be the result of a common interest, such as a collocated common area or an anticipated need of the security resources due to proximity or strategic location. A complex arrangement of various entities owning and sharing the assets is stored in a distributed set of repositories that collectively define a peering infrastructure. The repository operates as a server for managing the peering relationships and controlling access thereof. The peering relationship that permits usage of particular security assets by others enumerates several players or roles. Contributors own security assets that may be enabled for access by subscribers. Subscribers receive access to the contributed assets, and may also be contributors (i.e. a security installation may have both assets such as cameras to contribute and may also want to peer with cameras contributed by other installations). Thus, the same entity, corporation or security installation may be both a contributor 380 and subscriber 390. Agents have authority to designate access to contributed security assets, typically delegated by a contributor 380 as a trusted overseer of the contributed assets. A token is issued by agents to subscribers to designate access to a contributed security asset, and operates similarly to a "ticket" to an event. The possessor of the token is afforded privileges to a security asset via a peering relationship, and multiple tokens may be issued and possessed depending on the degree of access intended. The token may incorporate public and private key encryption techniques for maintaining an appropriate level of access.

Figure 3B:
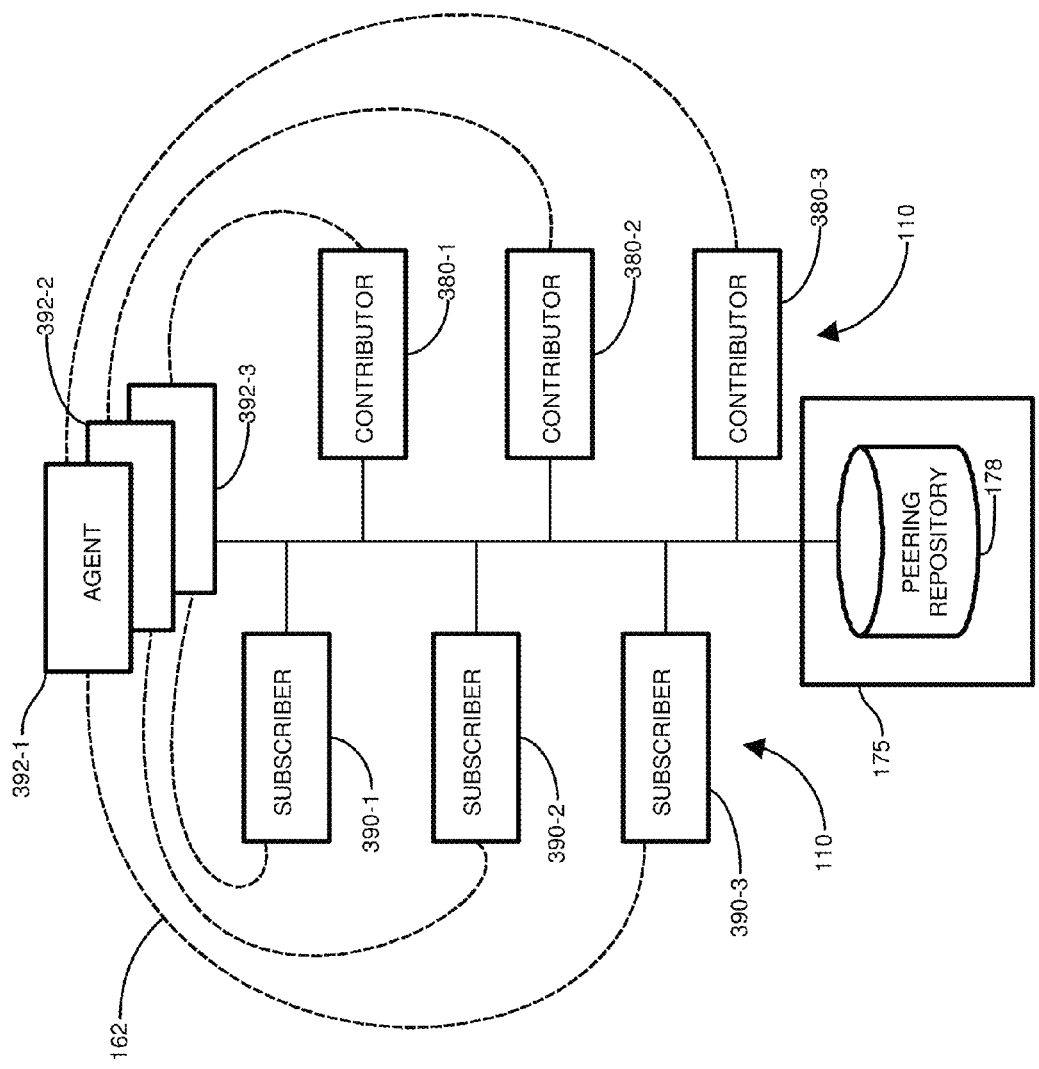
FIG. 3b is a context diagram of the security clearinghouse and distributed structure.

FIG. 3b is a context diagram of the security clearinghouse and distributed structure. Referring to FIGS. 1, 3a and 3b, a clearinghouse 175 employs a repository 178 for storing contributors 380-1 . . . 380-N (380 generally), subscribers 390-1 . . . 390-N (390 generally), and agents 392-1 . . . 392-N (392 generally). The clearinghouse 175, shown as a single entity but which may be distributed across multiple servers, contains the information relating the contributors 380, subscribers 390 and agents 392, and is used for defining and identifying peer links 162 between contributors 380 and subscribers 390.

As will be discussed further below, contributors 380 own security resources 130 and assets 140 that are made available for use by the contributors 390. It should be noted that the same entity may be both a contributor 380 and subscriber 390, such as in the above example of business entities surrounding a common area park, in which each concerned business both contributes and uses (subscribes to) the security resources of the other. Since the agents 392 receive the delegated power to grant access to the security assets 130, selection of and information given to the agents 392-N is likely to be viewed as a sensitive area. In a simplest context, the agent 392 could be a high ranking security officer for the security installation, thus the agent role simply extends the assets and resources 130 to which the office is already entrusted. At an opposite end of the continuum, a large multinational corporation with a substantial quantity of geographically distributed resources 130 may wish to delegate the agent 392 power and responsibility to geographically situated employees, contractors, or possibly even political figures. Selection and definition of the trust relationships 162 afforded to the agents 392 represents a substantial security question for the contributors of the concerned resources 130.

The method for scalable sharing of security assets by developing the infrastructure of contributors 380, subscribers 390 and agents 392 includes identifying a plurality of security assets 130 from contributors 380, and designating a subset of the identified security assets 130 for remote access via the peering relationships 162, thus authorizing a subscriber 390 for access to the designated security assets. Depending on the quantity and location of the security assets, the clearinghouse 175 may designate a subset of the identified security assets as a group, such that the group has collective access by the authorized subscriber 390.

In the example configuration, the contributor owned security assets may be enabled for access by subscribers by receiving an indication of shareability for each asset contributed by the contributor 380; and receiving a delegation to authorize a subscriber 390 for access to the security asset. Such delegation may include identifying an agent 392 having authority to designate access to contributed security assets, such that the subscriber 390 is responsive to receiving, from the identified agent 392, a token operative to provide access to the security asset. The token indicates that the possessor is authorized to access the asset to which the token corresponds. Additional tokens may be issued for other assets. In the example arrangement, the token may be a number, password, or may be a form of digital data encoded on a physical device, such as a magstrip card, RFID, flash memory, or other suitable device.

Each security asset, therefore, is responsive to a token transferred to the subscriber 390 by the agent 392 upon agent 392 approval. The agents are hence enabled by the contributor to grant access to the contributed assets of the contributor 380. Each indication of shareability indicates a set of agents authorized to enable access to the contributed security asset. In other words, each asset has one or more corresponding agent 392 authorized to grant access, via a token, access to the asset. The agent 392 therefore has authority to designate access to contributed security assets of a contributor 380 by, designating an agent 392 for granting access to a security asset by a subscriber 390, and transferring, from the designated agent 392, a token operative to grant access to the security asset to the subscriber 390. The subscriber then receives an indication of the token prior to permitting the subscriber 390 to access the security asset. In a particular configuration, security infrastructure servers defining the peering repository 178 publish information about its resources into a data/metadata store. In the disclosed implementation, a cloud based directory is employed. The metadata including information on each of the devices, such as name, type, location (both textual and GIS coordinates, possibly altitude as well). Data, in the case of sensors, may include the current and/or historical values. Servers may optionally publish access control information that details requirements that much be met in order to have access to its published data/metadata.

Trust relationships (cryptographic tokens exchanged) between the servers and the data/metadata store such that the identity and data of the server can be determined to be authentic. Some open systems may be inherently trusted, so this is not a requirement but is certainly best practice. A data/metadata store that can hold information that may be replicated and located in part or in whole in different physical servers. This can be thought of as either an enterprise like, private cloud or may be housed in a public facing cloud. The "cloud" replicas may each contain all or the information or may only contain parts. For example, there may be requirements that certain data is not only not available because of access control reasons to some users, but that the presence of the data/metadata itself will be controlled such that for example, a replicated cloud data store could have a larger (or simply different) set of data available on the "private" side of the cloud vs the "public" side. Similarly in a cross agency or cross company kind of deployment, data could be contained so that only the "externally" available data is stored on servers outside of the "company", or perhaps only on the company and their partners set of cloud servers.

As shown in FIG. 3b, selection of an the agent 392 by the contributor 380, and subsequent selection by the agent of a subscriber 390, defines the links 162 that establish a trust relationship between the agents 392, subscribers 390 and contributors 380. However, the subscriber/agent and the contributor 380 do not have to share any information about the actual subscribers local authentication, i.e. nowhere does the contributor have to have a list of names/credentials for all of the subscribers that belong to the agent. Therefore, the contributors may not have actual knowledge of who is using their resources. To this end, the contributor 380 may wish to establish rules for the clearing house on who it allow to use those assets, and have assurances that the rules are followed. This generally implies the establishment of a cryptographic trust relationship between the contributor and the clearinghouse.

The clearinghouse may also have an directory service that can be used to lookup/locate subscriber assets, via the asset metadata, again implying appropriate authentication and encryption to ensure access to resources only by subscribers having tokens to do so. It will be expected that there will be people or systems that desire to use (subscribers) the assets that the contributor has shared with the clearinghouse, and thus have an incentive to obtain a token, underscoring the power entrusted to the agents by the contributor. Thus, there may be an agent 392 for the subscribers 390 that can be used to identify (authenticate) the subscribers, using an authentication system that is not required to be privy to the contributor, i.e. a potentially independent authentication system. In other words, the agent 392 authority to grant access, via tokens, to subscribers is limited only by the preset rules of the contributor, and the contributor may thereafter be limited in ability to monitor subscriber usage of the resources 130.

The agent trust relationship, once granted by the contributor of the resource, thus establishes a system whereby the contributor has delegated through the resource to the agent, the right to create tickets for users selected by the agent (subscribers). Agent can then receive requests to access contributors assets and create a ticket using the delegated right and crypto assets, such that a request for an asset can arrive at the asset (or an authentication server managing the asset) that can be cryptographically show to have been created by the agent 392 and that the agent had the right to create that ticket delegated by the subscriber 390.

In other words, the delegation of the agent defines establishment of two trust relations, a first trust relation from the contributor to the agent for permitting access to a particular security asset, and a second trust relation from the agent to the subscriber for affording access to the security asset by the subscriber, such that the contributor may not privy to the second trust relation and may not know the identity of the subscribers to whom the agent has distributed tokens. It is expected that each of the first and second trust relations are an electronically authenticateable relations, and that the token is effected by electronic transmission from the agent to the subscriber for enabling usage of the corresponding security resource, both by any suitable means of electronic authentication and encryption.

The agent, therefore, has visibility of security assets of tokens delegated to the agent, but may not have visibility of other security assets of the delegating contributor. Similarly, the contributor has visibility of an identity of contributed security resources, i.e. the resources they contributed, but may not necessarily have visibility of distribution of tokens corresponding to the contributed security assets.

The data/metadata store defining the repository 178 will have one or more interfaces whereby other agents (clients, other servers etc) can access the data/metadata, provided they meet the authentication requirements of both the data/metadata store and the publishing server's requirements. This interface may provide the ability to perform queries based on names, descriptions, locations (text and/or GIS), and optionally based on values or non-compliant or alert-able values.

Trust relationships (cryptographic tokens exchanged) between the replicas of the data/metadata store such that the identity and data of the replicas can be determined to be authentic. Some open systems may be inherently trusted, so this is not a requirement but is certainly best practice. Agents (clients, other servers, etc) that want to access the servers to search for and/or acquire the data/metadata. Trust relationships (cryptographic tokens exchanged) between the Agents and the data/metadata store such that the identity and data of the Agent can be determined to be authentic. Some open systems may be inherently trusted, so this is not a requirement but is certainly best practice.

In an enterprise, it is common to have a single access control system and to be able to declare users and users rights in a single enterprise wide database. In this scheme, agents can be authenticated against their own (or a common authentication database) and in turn, because they are authenticated with their database and because that authentication system has been setup to be a trusted authentication system, the agents can present themselves authentically and in a trusted way to the data/metadata store, and the data/metadata store can contain the necessary mappings of trust to enable an agent 394. For example, within a trusted Active Directory system called Company X, to be able to access resources that were provided by Company Y. The mapping and managing of authentication can be as simple, as "we trust all authenticated users from trusted system" or as narrow, as we trust only users of a specific authentication system that whose usernames match "X", and/or who carry a specific right. Thus, for example, a authentication requirement could be placed on a resource, that said that we will allow "any operator from Bigcompany for read access to our devices". Which, means that that to access the data of the device, the agent must be authenticated by the Bigcompany (likely Active Domain system), and the specific user must be a member of the "Operator" group. There are many ways to express this configuration information, this technique is not limiting the expression to be human like text, that was for example only.

Third party authentication may also be employed to allow the trust model to be extended such that based on the trust between the parties, a provider of resources can make resource access right statement in generic terms, such as "I provide my specific or general resources to any agent that holds the data/metadata store right of XXXoperator." The XXXoperator is intended to be a specific right that is defined within the data/metadata store that a resource provider can use to reference users that hold that right. On the other side, trusted authentication systems, can be defined to map their local rights into the data/metadata stores specific rights. In practice, a mapping of security operator rights within the Active Directory of company A, could be mapped to an arbitrary right on the data/metadata store. For example company A's security operator could be mapped to cloud operators, and on company B's access control requirements they could be expressed as allowing access by cloud operators. Now any authentication system that has been trusted and allowed to declare some mapping to cloud operators, will be allowed to access the resources of company B's resources.

In the example arrangement, the token is similar to a "ticket" indicative of the agent 392, the security asset, and the subscriber 390 granted access, such that the ticket is transferable to a plurality of subscribers by the agent 392. wherein the token is electronically transferable and authenticatable. The token 394 is responsive to electronic transmission from the agent 392 to the subscriber 390, such that the security asset 130 is responsive to the token 394 for permitting remote access by an authenticated subscriber identified by the token. The subscribers 390 receive access to security assets from an agent 392 authorized to permit access to the security asset; the agents having authority to designate access to contributed security assets based on the assent of the contributor 380 of the security asset.

The clearinghouse 175, although depicted as a single location, may be distributed and defines database of security assets, including a set of information repositories 178 for storing an identity of security assets 130 configured for gathering security information, subscribers 390 that receive access to the security assets, and contributors 380 that own the security assets that may be enabled for access by subscribers. The agents 394 have authority to designate access to the contributed security assets 130 to the subscribers 390 on behalf of the contributors 380, which may be subject to rules indicative of conditions under which the subscribers may invoke the designated access to the security assets. In other words, the agent authority to distribute tokens may be conditional or limited. Also included is a workstation or computing device including logic responsive to requests for the stored security assets, subscribers, contributors, agent 392 and rules. For example, an agent 394 may invoke an agent workstation including information on the tokens managed and distributed by that agent. The token is therefore issued by an agent 392 to a subscriber 390 for designating access to a security asset, the token indicative of the security asset and the accessing subscriber.

The set of information repositories is responsive to requests for tokens 394, such that the token 394 is electronically transferable and authenticatable. The token is responsive to electronic transmission from the agent 392 to the subscriber 390, in which the corresponding security asset 130 responsive to the token for permitting remote access by an authenticated subscriber identified by the token. Tokens may also be distributed manually via a storage or encoding device, as discussed above. The set of information repositories may includes a registration server for storing information including an identity of the contributors, subscribers, and assets and an agent database storing only tokens under control of the agent 392 and the subscriber 390, contributor 380 and asset to which the tokens 394 correspond.

Figure 3C:
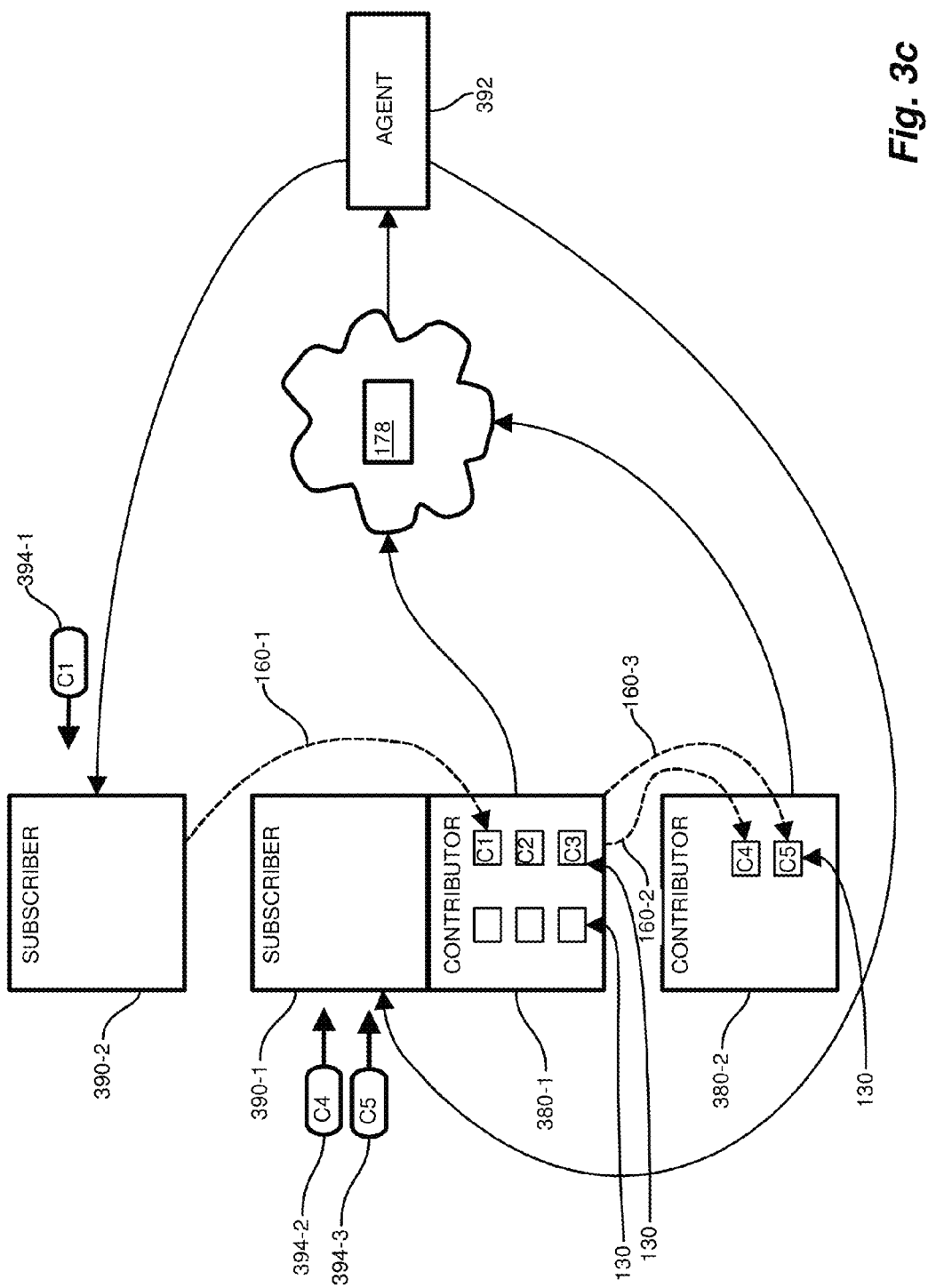
FIG. 3c is a block diagram of the security clearinghouse and related contributors, subscribers and agents.
Figure 4:
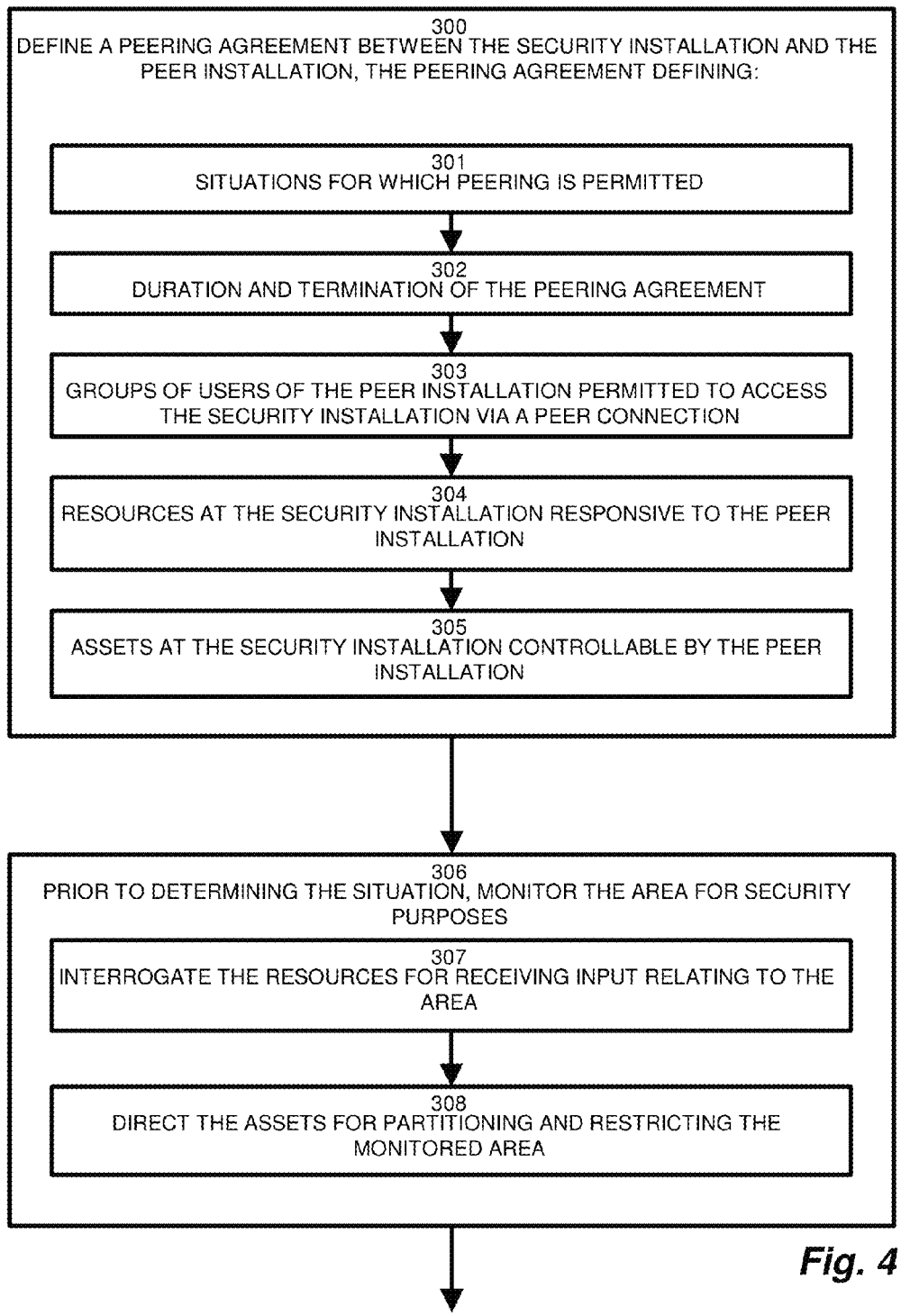
FIGS. 4-8 are a flowchart of security system monitoring, detection, and peering in the system depicted in FIG. 3.
Figure 5:
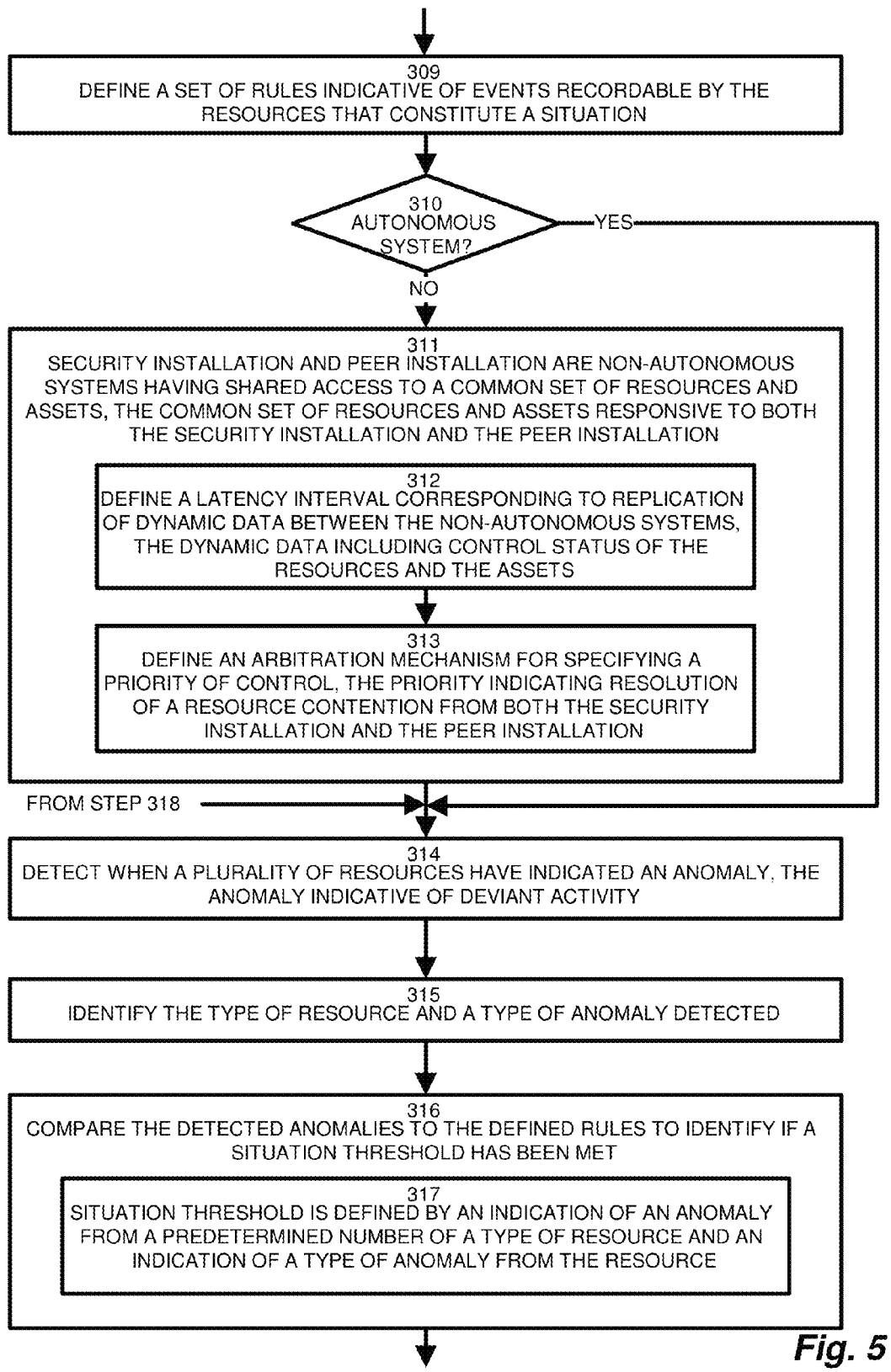
Figure 6:
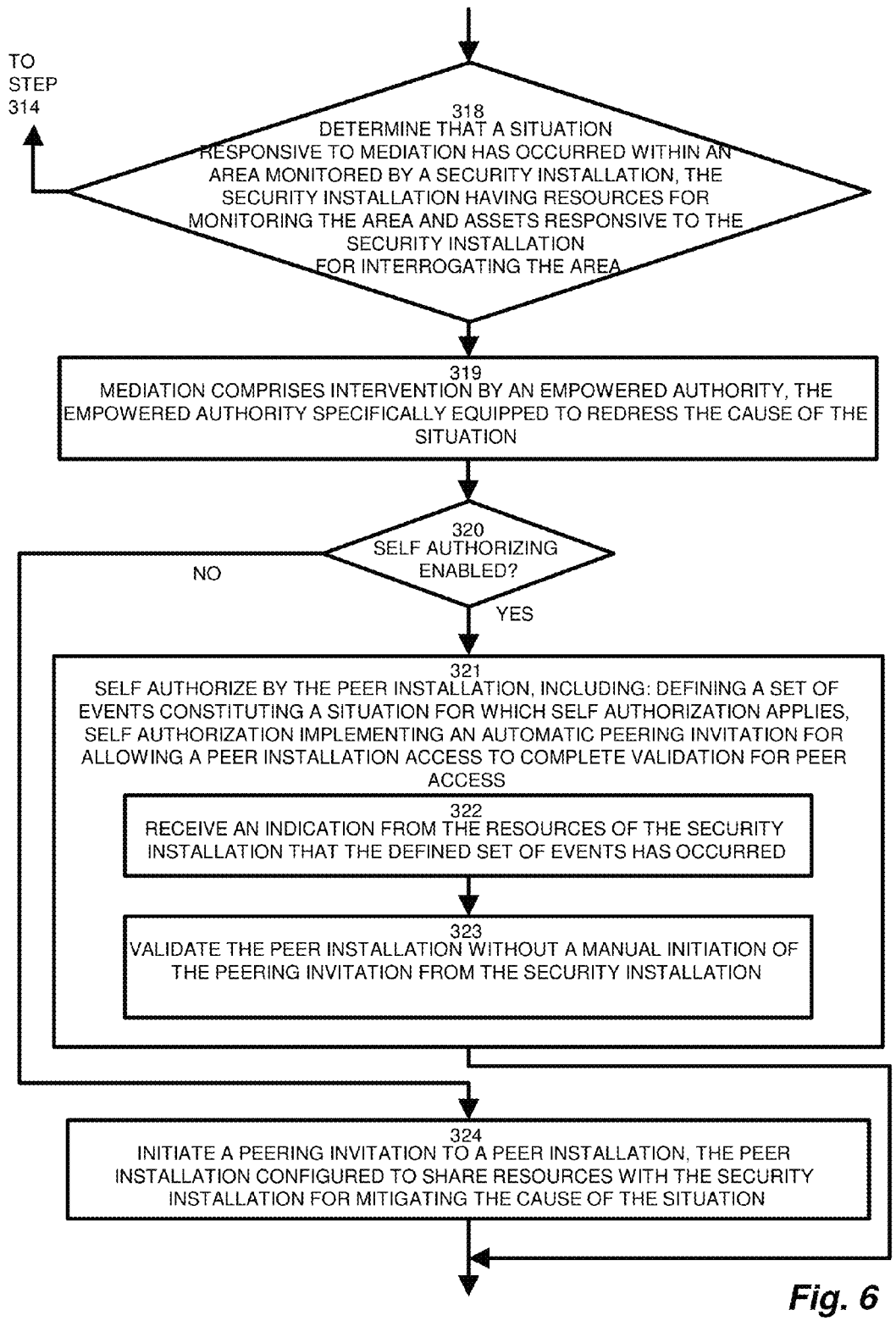
Figure 7:
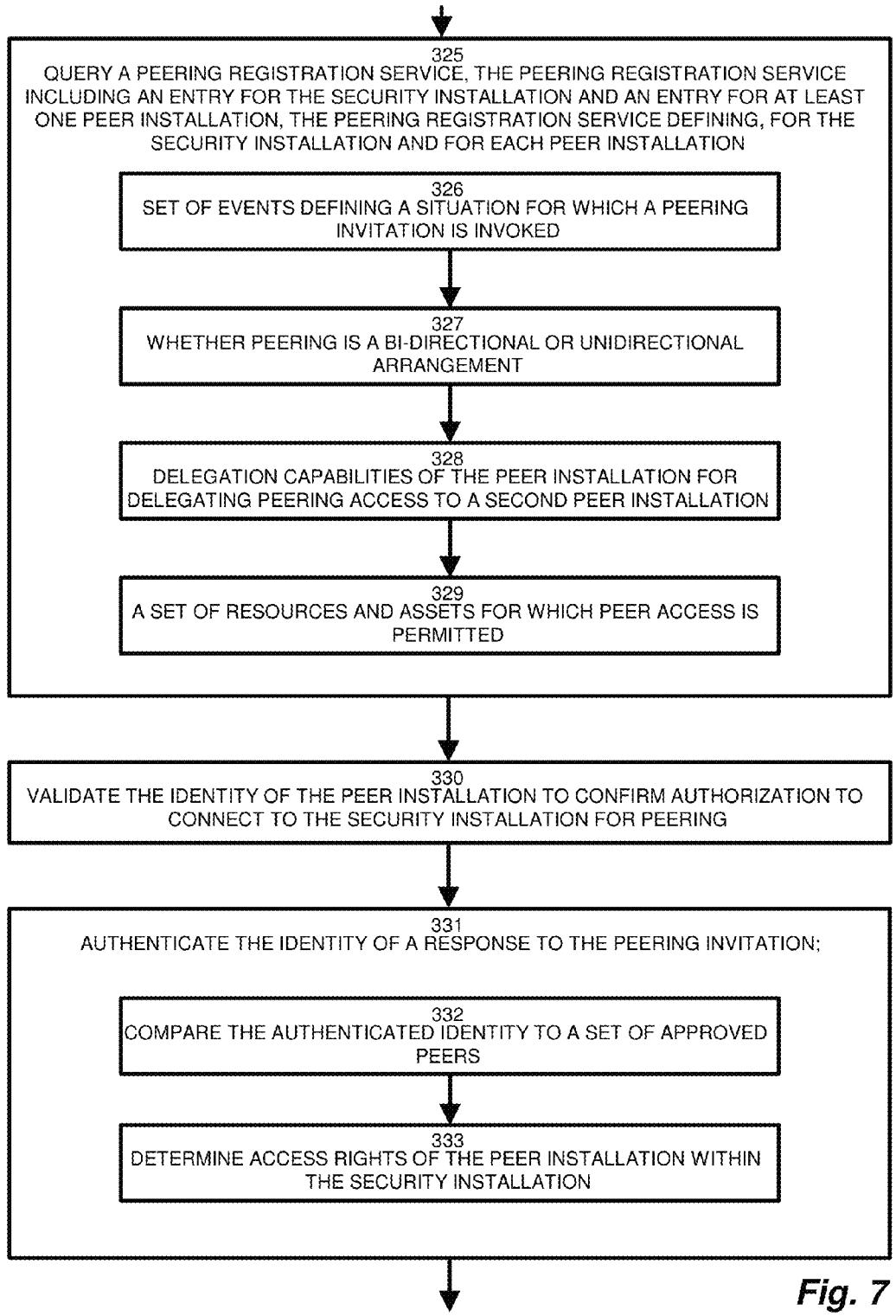
Figure 8:
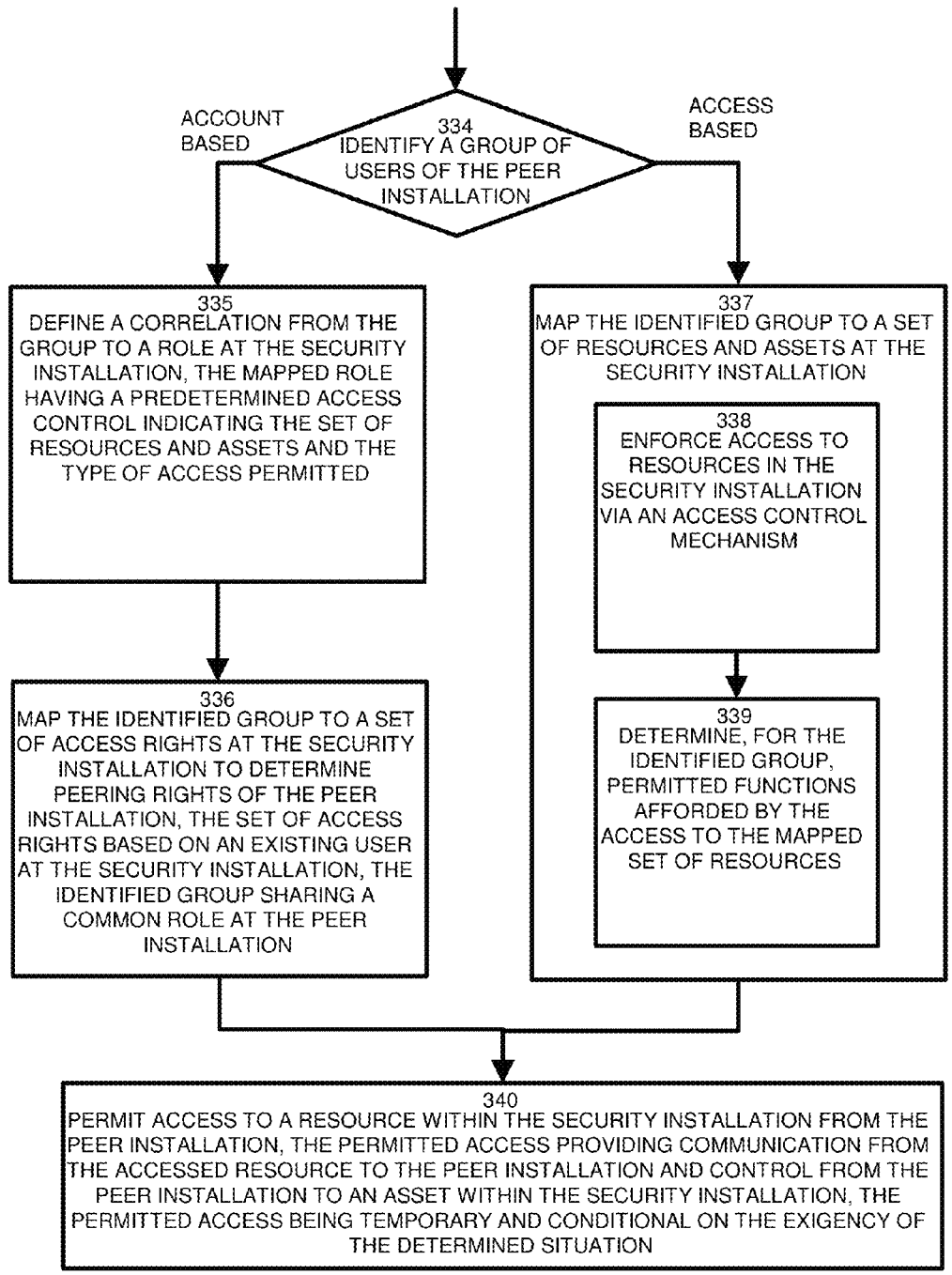

FIG. 3c is a block diagram of the security clearinghouse and related contributors 380, subscribers 390 and agents 392. The agent 392 receive tokens 182 from the repository 178 on behalf of the contributor 380. In an example arrangement, the agent 392 may have a server node (i.e. PC, laptop, etc.) of the distributed repository 178, for storing tokens 182 under the control of the agent 392. An agent 392 may be entrusted with tokens from several contributors, depending on the circumstances under which the contributor 380 allows the resource to be shared (peered). Each token 182 identifies the particular resource 130 to which it offers access, the contributor 380 of the resource, and the subscriber 390 to whom the agent 392 has distributed it to. The token may be a single identifier, such as a number, text string or password, or may be part a more complex public or private key mechanism.

In the example shown, the contributor 380-1 has multiple resources 132, of which C1, C2 and C3 are permitted for peering access. Agent 392 issues a token for resource C1 in the form of a token message 394-1. The token message 394-1, when received by subscriber 390-2, establishes a peer relationship 160-1 with the resource C1. Similarly, the same agent 392 also issues token messages 394-2 and 394-3 to subscriber 390-1, which is the same entity that contributed resource C1. The messages 394-2 and 394-3 establish a peering relationship for Subscriber 390-1 for resources C4 and C5 of contributor 380-2.

The above described infrastructure approach for controlling access to shared security assets includes a server for identifying a plurality of security assets from contributors, each contributor 380 designating a set of the identified security assets for remote access, and an agent 392 having authority to designate access to the contributed security assets to the subscribers on behalf of the contributors. Each agent manages a plurality of tokens, such that each security asset responsive to a token, in which the token transferred to the subscriber 390 by the agent 392 upon agent approval. The distributed nature of the infrastructure approach may take a variety of physical forms, depending on the locations to which it applies. Typically, at least one security installation defined by at least one geographic site related by a common ownership or control structure is included, such that the security installation has centralized control over the group and being a contributor 380 of the security assets of the group.

FIGS. 4-8 are a flowchart of security system monitoring, detection, and peering in the system depicted in FIG. 3*a*. Referring to FIGS. 3-8, a peering relationship and operation typically begins with a peering agreement 180 between potential peer installations 110, 152. The disclosed method defines a peering agreement 180 between the security installation 110 and the peer installation 152, as depicted at step 200. The peering agreement 180 may also encompass multiple parties, such as schools in a particular municipality as well as local police, fire, and hospitals. Such a peering agreement may be codified on paper, or may be entirely electronic, and indicates to the security installation 110 the situations for which peering is permitted, as depicted at step 301, the duration and termination of the peering agreement, as shown at step 302, the groups of users of the peer installation permitted to access the security installation 110 via the peer connection 190, as depicted at step 303, the resources 130 at the security installation 110 responsive to the peer installation 152, as disclosed at step 304, and the assets 140 at the security installation 110 controllable by the peer installation 152, as disclosed at step 305. Other parameters may be included, and the conditions to establish peering may be automatic, as is preferable with emergency "first responder" types of situations, or may require proactive consent by the security installation.

Once a peering agreement 180 is in place, normal operation typically entails the security installation 110, prior to determining any occurrence of a peering situation, monitoring the area for security purposes, as shown at step 306. The normal "business as usual" operation includes interrogating the resources 130 for receiving input relating to the area 100, as depicted at step 307, and directing the assets 308 for partitioning and restricting the monitored area. Typical resources 130 include devices such as video cameras 132, frequently observed by security personnel, and may include automated features such as object and/or face recognition and other image processing aspects. Assets 140 include items such as door locks and gates, which may be locked and unlocked at particular times or set for keycard/passcode only operation at particular times.

In order to identify a situation from among the normal day-to-day operations at the security installation 110, the situation analyzer defines a set of rules 118 indicative of events recordable by the resources 130 that constitute a situation, as depicted at step 309. A further distinction is drawn depending on whether peering is enabled with autonomous or non-autonomous systems, as shown at step 310. In an autonomous system, devices are not normally shared with other systems, hence installations normally maintain separate management and establish shared control only via peering. Non-autonomous systems are typically different branches or groups of a common larger organization or entity. In the case of a non-autonomous peering, the security installation 110 and peer installation 152 normally have shared access to a common set of resources 130 and assets 140, such that the common set of resources 130 and assets 140 is responsive to both the security installation 110 and the peer installation 152, as shown at step 311. A peering relationship between non-autonomous systems may generate conflicting and/or ambiguous control scenarios. Accordingly, the security server 112 defines a latency interval corresponding to replication of dynamic data between the non-autonomous systems, such that the dynamic data includes a control status of the resources 130 and the assets 140, as depicted at step 312. The server 112 also defines an arbitration mechanism for specifying a priority of control, in which the priority indicates resolution of a resource contention from both the security installation 110 and the peer installation 152, as disclosed at step 313.

During the normal course of operation, the security server 112 identifies and reports events which may or may not evoke a human or automated response from the central office 116 or security server 112, respectively. The security server 112 detects when one or more resources 130 have indicated an anomaly indicative of deviant activity within the area 100, as depicted at step 314, and identifies the type of resource 130 and a type of anomaly detected, as disclosed at step 315. The situation analyzer 114 compares the detected anomalies to the defined rules 118 to identify if a situation threshold has been met, as depicted at step 316. Alternatively, deviant activity may be determined or concluded simply by operator inspection of a monitor and/or area, thus involving manual triggering of a peering need, such as via a phone call or email. The situation threshold is defined by an indication of an anomaly from a predetermined number of a type of resource 130 and an indication of a type of anomaly from the resource 130, as shown at step 317, and may cover a variety of different scenarios, such as the fire alarm and break-in examples depicted above. The rules 118 are suited to the particular security installation 110 and are tailored to identify a sequence of events, including recurrence of the same event or a particular combination of complementary occurrences, that indicate a substantial enough departure from the normal course of action to conclude that a response to the situation is appropriate.

A check is performed, at step 318, to determine if a situation responsive to mediation has occurred within the area 100 monitored by the security installation 110, in which the security installation 110 has resources 130 for monitoring the area 100 and assets 140 responsive to the security installation 110 for interrogating the area. If no redressable situation has occurred, control reverts to step 314 to continue monitoring. Otherwise, the security installation 110 has concluded that mediation is called for to resolve the situation, in which mediation includes intervention by an empowered authority, such that the empowered authority (e.g. police, fire) is specifically equipped to redress the cause of the situation, as depicted at step 319.

A check is performed, at step 320, to determine if self authorization is enabled. If so, the peer installation 152 is automatically enabled by the security server 112 or other means (such as a password known to the peer installation). Self authorization is desirable if it is impracticable or unsafe for human operator availability to enable peering, such as in the case of a fire or other evacuation leaving the central office 116 devoid of human operators to provide an affirmative peering invitation 170. In the case of self authorizing, the peering invitation 170 further comprises self authorization by the peer installation 152, including: defining a set of events received at the security installation constituting a situation for which self authorization applies, self authorization implementing an automatic peering invitation for allowing a peer installation access to complete validation for peer access, as depicted at step 321. In such a scenario, the security server receives an indication from the resources 130 of the security installation 110 that the defined set of events has occurred, as depicted at step 322, and validates the peer installation 152 by automatically enabling a connection 192 without a manual initiation of the peering invitation 170 from the security installation 110, as disclosed at step 323.

Otherwise, a proactive response provides the peering invitation 170, such as an electronic port, address, or firewall command, or a transmitted password, for example. Otherwise, the security server 110 initiates a peering invitation 170 to a peer installation 152, in which the peer installation 152 is configured to share resources 130 with the security installation 110 via the peering connection 190 for mitigating the cause of the situation, as depicted at step 324.

Depending on the arrangement and availability of potential peer installations 152, the peering invitation 170 or self-authorization 192 may employ a peering registration service employing a peer registration database 194. Depending on the peer installation 152 sought by the situation, the security server 112 queries a peering registration service having the peer registration database 194. The peering registration service and database 194 includes an entry for the security installation 110 and an entry for at least one peer installation 152, such that the peering registration service defines operational parameters for the security installation 110 and for each peer installation 152, as shown at step 325. The operational parameters enable differences in data formats, protocols, and user privileges to be normalized or translated between peered installations 110, 152 by transferring metadata and protocol information. In the example arrangement disclosed, the peer registration database 194 includes information pertaining to a set of events defining a situation for which a peering invitation 170 is invoked, as shown at step 326; whether peering is a bi-directional or unidirectional arrangement, as depicted at step 327, delegation capabilities of the peer installation 152 for delegating peering access to a second peer installation 152', as disclosed at step 328; and a set of resources 130 and assets 140 for which peer access is permitted, as depicted at step 329.

Depending on the desired response to a specific situation, particularly in the case of self-authorizing peer installations 152, different peers 152 may be called upon depending on the nature of the situation. A detected break-in would have little need for the fire department. Bi-directional and unidirectional peering indicate a reciprocal relationship with respect to shared assets, since an assisting organization may have little need to make their resources available to the assisted security installation, e.g. the school doesn't need access to the police department's systems for investigating a break-in. However, the police department may appreciate the ability to delegate peering to other entities that may be called in if a situation escalates, such at to state police and federal authorities. A non-delegatable peering limits the peered installation 152 from transferring access any further. Also, peered access may be provided not absolutely, but rather only to resources 130 and assets 140 germane to the situation.

Once the peer installation 152 is identified and any registration information processed, the security installation validates the identity of the peer installation 152 to confirm authorization to connect to the security installation 110 for peering, as depicted at step 330. This may simply involve a password authentication, or may invoke more substantial authorization such as public key credentials and/or biometric authentication, as the access sensitivity demands, as shown at step 331. Accordingly, validating the identity of the peer installation 152 generally includes authenticating the identity of a response to the peering invitation, and comparing the authenticated identity to a set of approved peers 152, as disclosed at step 332. The security server 112 then determines the access rights of the peer installation 152 within the security installation 110. As indicated above, absolute access to all resources 130 and assets 140 need not be provided, depicted at step 333.

Once the particular peer installation 152 has been determined and authentication has been confirmed, the access control applicable to the peer installation 152 is determined. In a small installation, complete access to all of the resources 130 and assets 140 by the peer installation may be appropriate, however it is likely that only necessary or prudent access and control be given the peer installation 152, and then only to individual operators with adequate knowledge of the security installation to be effective. One mechanism employed in the example arrangement is group based, and denotes a group of users having similar access rights from the peer installation to have similar rights (access) to the security installation. Accordingly, determining the access rights includes identifying a group of users of the peer installation, as shown at step 334.

A group of users may be associated with individual access rights, or mapped to the same rights as a particular native user (i.e. guest) of the security installation. If a particular user (i.e. account) at the security installation is employed, then mapping defines a correlation from the group to a role (i.e. account) at the security installation 110, such that the mapped role has predetermined access control indicating the set of resources 130 and assets 140 and the type of access permitted at the security installation, as shown at step 335. The security installation then maps the identified group to a set of access rights at the security installation 110 to determine peering rights of the peer installation 152, such that the set of access rights is based on an existing user at the security installation 110, as depicted at step 336. In this manner, the identified group shares a common role at the peer installation;

If a higher level of granularity is appropriate, then the security server 112 maps the identified group from the peer installation to a set of resources 130 and assets 140 at the security installation 110, as depicted at step 337, thus enforcing access to resources in the security installation via an access control mechanism specific to individual resources 130 and assets 140, as shown at step 338, rather than tying the entire group to a single account at the security installation, which might leave a subset of peered users with excessive or inadequate access. The peer installation 110 thus identifies a group corresponding to a set of access rights at the peer installation, for which the security server then determines, for the identified group, permitted functions afforded by the access to the mapped set of resources 130 and assets 140, as depicted at step 339. At step 340, the security server 112 permits access to a resource 130 within the security installation 110 from the peer installation 152, in which the permitted access provides communication from the accessed resource 130 to the peer installation 152 and control from the peer installation 152 to an asset 140 within the security installation, the permitted access being temporary and conditional on the exigency of the determined situation. Thus, the peered system employs the resources 130 and assets 140 as its own for the duration of the situation, and peered access withdrawn once the exigency subsides. Less critical situations, such as the non-autonomous (i.e. same organization) scenario suggested above, may employ peered access as an alternative control mechanism, possible in a failover mode if the central office 116 of a particular facility is disabled or compromised.

Those skilled in the art should readily appreciate that the programs and methods for video security system peering defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for video security system peering has been particularly shown and described with references to embodiments thereof, it will be understood by those skilled in the art that various changes in form and details may be made therein without departing from the scope of the invention encompassed by the appended claims.

What is claimed is:

1. A method for scalable sharing of security assets comprising:
   identifying a plurality of security assets from contributors, the contributors each owning security assets that are selectively enabled for access by a subscriber;
   receiving an indication of shareability for each asset contributed by the contributor;
   designating a subset of the identified security assets as a group for remote access;
   receiving a delegation to authorize a subscriber for access to the security asset, delegating further including identifying an agent, the agent having authority to designate access to contributed security assets, the subscriber responsive to receiving, from the identified agent, a token operative to provide access to the security asset; and
   authorizing the subscriber for access to the designated group of security assets, the group having collective access by the authorized subscriber.

2. The method of claim 1 wherein each security asset is responsive to a token, the token transferred to the subscriber by the agent upon agent approval.

3. The method of claim 1 wherein the agent has authority to designate access to contributed security assets of a contributor, further comprising:
   designating an agent for granting access to a security asset by a subscriber;
   transferring, from the designated agent, a token operative to grant access to the security asset to the subscriber; and
   receiving an indication of the token prior to permitting the subscriber to access the security asset.

4. The method of claim 3 wherein the token is a ticket indicative of the agent, the security asset, and the subscriber granted access, the ticket transferable to a plurality of subscribers by the agent.

5. The method of claim 3 wherein the token is electronically transferable and authenticatable, the token responsive to electronic transmission from the agent to the subscriber, the security asset responsive to the token for permitting remote access by an authenticated subscriber identified by the token.

6. The method of claim 1 wherein the subscribers receive access to security assets from an agent authorized to permit access to the security asset; the agents having authority to designate access to contributed security assets based on the assent of the contributor of the security asset.

7. The method of claim 1 wherein the contributor owns exclusive control over the security assets contributed.

8. A repository of security assets, comprising:
   a set of information repositories for storing:
      an identity of security assets configured for gathering security information;
      subscribers that receive access to the security assets;
      contributors that own the security assets that may be enabled for access by subscribers, each contributor designating a subset of owned security assets that are selectively enabled for access by the subscribers;
      an indication of shareability for each designated asset contributed by the contributor; and
      agents having authority to designate access to the contributed security assets to the subscribers on behalf of the contributors;
      a token, the token issued by an agent to a subscriber for designating access to a security asset, the token indicative of the security asset and the accessing subscriber;
   rules indicative of conditions under which the subscribers may invoke the designated access to the security assets; and
   logic responsive to requests for the stored security assets, subscribers, contributors, agent and rules, the logic responsive to receiving a delegation to authorize a subscriber for access to the security asset, the group having collective access by the authorized subscriber.

9. The repository of claim 8 wherein the set of information repositories is responsive to requests for tokens, the token electronically transferable and authenticatable, the token responsive to electronic transmission from the agent to the subscriber, the security asset responsive to the token for permitting remote access by an authenticated subscriber identified by the token.

10. The repository of claim 8 wherein the set of information repositories includes a registration server for storing information including an identity of the contributors, subscribers, and assets and an agent database storing only tokens under control of the agent and the subscriber, contributor and asset to which the tokens correspond.

11. A system for controlling access to shared security assets comprising:
   a server for identifying a plurality of security assets from contributors, each contributor designating a subset of the identified security assets for remote access;
   an agent having authority to designate access to the contributed security assets to the subscribers on behalf of the contributors; and
   a plurality of tokens, each security asset responsive to a token, the token transferred to the subscriber by the agent upon agent approval, further comprising
   establishment of a first trust relation from the contributor to the agent, the first trust relation for permitting access to a particular security asset, and a second trust relation from the agent to the subscriber,
   the second trust relation for affording access to the security asset by the subscriber, wherein the contributor is not privy to the second trust relation.

12. The system of claim 11 further comprising a group defined by a subset of the identified security assets, the group having collective access by the authorized subscriber, wherein each agent corresponds to a group, the agent designating the security assets of the group to the subscribers.

13. The system of claim 12 further comprising at least one security installation, the security installation defined by at least one geographic site related by a common ownership or control structure, the security installation having centralized control over the group and being a contributor of the security assets of the group.

14. The system of claim 13 wherein the contributors own security assets that are selectively enabled for access by subscribers, the set of repositories operable to:
   receive, from the contributors, an indication of shareability for each asset contributed; and
   transmit, to the agents, a delegation to authorize a subscriber for access to the security asset.

15. The system of claim 13 further comprising a registration server for storing information including an identity of the contributors, subscribers, and assets and an agent database storing only tokens under control of the agent and the subscriber, contributor and asset to which the tokens correspond.

16. The system of claim 11 wherein the first and second trust relations are an electronically authenticateable relation, and the token is effected by electronic transmission from the agent to the subscriber for enabling usage of the corresponding security resource.

17. The system of claim 11 wherein the agent has visibility of security assets of tokens delegated to the agent, and does not have visibility of other security assets of the delegating contributor.

18. The system of claim 11 wherein the contributor has visibility of an identity of contributed security resources, and does not have visibility of distribution of tokens corresponding to the contributed security assets.

* * * * *